United States Patent
Tohki et al.

(10) Patent No.: US 7,734,794 B2
(45) Date of Patent: Jun. 8, 2010

(54) NETWORK COMMUNICATION DEVICE

(75) Inventors: Shinsaku Tohki, Tenri (JP); Tetsuya Shibata, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 962 days.

(21) Appl. No.: 10/370,465

(22) Filed: Feb. 24, 2003

(65) Prior Publication Data

US 2003/0163574 A1 Aug. 28, 2003

(30) Foreign Application Priority Data

Feb. 28, 2002 (JP) .............................. 2002-054754

(51) Int. Cl.
G06F 15/16 (2006.01)

(52) U.S. Cl. ...................... 709/228; 358/1.15; 358/400; 358/402

(58) Field of Classification Search ................. 709/206, 709/229, 230; 358/1.15, 402, 400
See application file for complete search history.

(56) References Cited

U.S. PATENT DOCUMENTS

| | | | |
|---|---|---|---|
| 6,437,873 B1 * | 8/2002 | Maeda ....................... | 358/1.15 |
| 6,457,044 B1 * | 9/2002 | IwaZaki ..................... | 709/206 |
| 6,650,440 B1 * | 11/2003 | Wing ......................... | 358/402 |
| 6,687,742 B1 * | 2/2004 | Iwazaki ...................... | 709/206 |
| 6,751,670 B1 * | 6/2004 | Patterson ................... | 709/229 |
| 6,775,705 B2 * | 8/2004 | Maeda ........................ | 709/230 |
| 6,823,367 B1 * | 11/2004 | Wakasugi et al. ........... | 709/206 |
| 6,898,625 B2 * | 5/2005 | Henry et al. ................ | 709/206 |
| 7,191,221 B2 * | 3/2007 | Schatz et al. ................ | 709/206 |
| 7,199,906 B1 * | 4/2007 | Tamura ....................... | 358/400 |
| 7,274,476 B2 * | 9/2007 | Eguchi et al. .............. | 358/1.15 |
| 7,283,269 B2 * | 10/2007 | Tanimoto ................... | 358/1.15 |
| 7,394,559 B2 * | 7/2008 | Mori .......................... | 358/1.15 |
| 2002/0019848 A1 * | 2/2002 | Sugawara et al. ........... | 709/206 |
| 2002/0051221 A1 * | 5/2002 | Wakabayashi .............. | 358/402 |
| 2003/0164990 A1 * | 9/2003 | Watanabe ................... | 358/402 |

FOREIGN PATENT DOCUMENTS

| | | |
|---|---|---|
| CN | 1162231 A | 10/1997 |
| CN | 1292186 A | 4/2001 |
| EP | 1 059 777 A1 | 12/2000 |
| EP | 1 095 777 A1 | 12/2000 |

(Continued)

OTHER PUBLICATIONS

Larry Masinter, Dan Wing; "Extended Mode of Facsimile Using Internet Mail"; Dec. 30, 1997; Internet Fax Working Group; 20 pages.*

(Continued)

Primary Examiner—Dustin Nguyen
(74) Attorney, Agent, or Firm—Nixon & Vanderhye, P.C.

(57) ABSTRACT

A network communication device has a function as a network facsimile device for carrying out sending and receiving of data via a network. A facsimile document data is transmitted as e-mail. The device is capable of setting information indicative of whether or not the transmission confirmation response by Message Disposition Notification (MDN) is required, according to a receiver when sending the e-mail. On this account, it is possible to provide a network communication device capable of preventing unnecessary waiting for transmission confirmation response or unnecessary output of a record of failure of transmission.

14 Claims, 14 Drawing Sheets

FOREIGN PATENT DOCUMENTS

| | | | |
|---|---|---|---|
| JP | 9-214717 | A | 8/1997 |
| JP | 10-210086 | A | 8/1998 |
| JP | 11-15755 | A | 1/1999 |
| JP | 2000-183949 | A | 6/2000 |
| JP | 2000-347954 | A | 12/2000 |
| JP | 2001-43154 | A | 2/2001 |
| JP | 2001-265698 | A | 9/2001 |
| JP | 2001-309109 | A | 11/2001 |
| JP | 2001-345989 | A | 12/2001 |
| JP | 2002-10017 | A | 1/2002 |
| JP | 2002-16751 | A | 1/2002 |
| JP | 2002-32318 | A | 1/2002 |
| JP | 2002-33898 | A | 1/2002 |

OTHER PUBLICATIONS

Larry Masinter; "Revised Minutes of IETF Fax WG"; Apr. 20 1997; 5 pages.*

Dan Wing, Larry Masinter; "Using Message Disposition Notifications to Indicate Supported Features"; Mar. 10, 1998; The Internet Society; 7 pages.*

Graham Klyne; "Re: Comments on FPIM and replies (-01g)"; Dec. 8, 1997; 19 pages.*

RFC2301, Networking Working Group Request for Comments: 2301, McIntyre et al, "File Format for Internet Fax", 1998.

RFC2298, Network Working Group Request for Comments: 2298, Fajman, "An Extensible Message Format for Message Disposition Notifications", 1998.

Japanese Office Action and English translation thereof mailed Aug. 16, 2005 in corresponding Japanese patent application No. 2002-054754.

Chinese Office Action and English translation thereof mailed Dec. 24, 2004 in corresponding Chinese application No. 03106716.6.

Japanese Office Action and English translation thereof mailed May 24, 2005 in corresponding Japanese application No. 2002-054754.

* cited by examiner

FIG. 8

| ABBREVIATED NUMBER | NAME OF THE RECEIVER | E-MAIL ADDRESS | FILE FORMAT | COMPRESSION FORMAT | REQUEST FOR TRANSMISSION CONFIRMATION | TRANSMISSION CONFIRMATION WAITING TIME (1 TO 240 HOURS) | RESENDING NUMBER IN THE CASE OF RECEIVING TRANSMISSION ERROR (0 TO 15 TIMES) |
|---|---|---|---|---|---|---|---|
| 001 | *** | 11@**** | PDF | MH | YES | 1 | 2 |
| 002 | *** | 22@**** | PDF | MH | YES | 2 | 3 |
| 003 | *** | 33@**** | TIFF | MH | YES | 1 | 2 |
| 004 | *** | 44@**** | TIFF | MH | NO | - | - |
| . | . | . | . | . | . | . | . |
| . | . | . | . | . | . | . | . |
| . | . | . | . | . | . | . | . |

FIG. 10 (a)

| DESTINATION ADDRESS/ONE-TOUCH No. | ADDITIONAL INPUT | END |

- [ ] E-MAIL   [ ] FAX   [✓] INTERNET FAX

NAME OF THE RECEIVER _____   QUERY CHARACTER _____

INDEX _____   ADDRESS _____

KEY NAME _____   COMPRESSION FORMAT _____

| REQUEST FOR TRANSMISSION CONFIRMATION | TRANSMISSION CONFIRMATION WAITING TIMEOUT PERIOD | RESENDING NUMBER IN THE CASE OF RECEIVING TRANSMISSION ERROR |

FIG. 10 (b)

| DESTINATION ADDRESS/ONE-TOUCH No. | ADDITIONAL INPUT | END |

TRANSMISSION CONFIRMATION WAITING TIMEOUT PERIOD    [ OK ]

SET WAITING TIMEOUT PERIOD (0 TO 240 TIMES) FOR TRANSMISSION CONFIRMATION FROM INTERNET FAX OF THE RECEIVER

| ADDRESS OF DESTINATION/ONE-TOUCH No. | ADDITIONAL INPUT | END |

SET RESENDING NUMBER IN THE CASE OF RECEIVING TRANSMISSION ERROR    [ OK ]

SET RESENDING NUMBER (0 TO 15 TIMES)

2
▼ ▲

NETWORK COMMUNICATION DEVICE

FIELD OF THE INVENTION

The present invention relates to a network communication device for sending and receiving e-mail via a network.

BACKGROUND OF THE INVENTION

In recent years, with the development of network systems, a network communication device for sending and receiving e-mail via a network such as the Internet is used for various purposes.

For example, a network communication device with a scanning function has been created, which is capable of not only scanning an image but also sending the scanned image information to a device such as a computer connected to a network.

Further, a network facsimile device with a printing function or a telephone function in addition to the scanning function has been created.

An internet fax, as an example of the foregoing network facsimile device, is connected to a provider of the Internet via a telephone line so as to be connected to the Internet via the host computer of the provider of the Internet, or is directly connected to the Internet. With this state, sending and receiving of e-mail are carried out with an internet fax of the sending end and an internet fax of the receiving end, which are both connected to the Internet.

Unlike the case of sending information by a general facsimile, when thus sending information by using e-mail, there has been such a problem that the sending end cannot judge if the receiving has properly completed in the receiving end, and also if receiving operation has properly performed in the receiving end.

More specifically, unlike the case of using a G3 facsimile carrying out facsimile communication in real time at respective ends via PSTN (Public telephone network), when e-mail is sent from the sending end terminal to the receiving end terminal, the sending end terminal cannot recognize if the receiving of e-mail has properly completed in the receiving end terminal, and if receiving operation has properly performed in the receiving end terminal at the time of transmitting e-mail.

Therefore, conventionally, confirmation of the transmission by telephone has still been required when carrying out e-mail communication.

As described, even when sending information by e-mail, the user still has to take a trouble of confirming the transmission by using telephone. Therefore, the foregoing manner cannot provide the benefit of e-mail communication, which is supposed to enable the user to omit the trouble of real time conversation in contrast to telephone communication.

In order to solve the foregoing problem, RFC2298 regulates the method of MDN (Message Disposition Notification) as a method for confirming transmission by sending back a response for informing completion of the transmission to the sending end terminal from the receiving end terminal when e-mail is received in the receiving end terminal device.

The RFC (Request For Confirmation) is an official document published by the IETF (Internet Engineering Task Force), which is an organization for determining standards of technology regarding the Internet.

One example of the RFC has various protocols used in the Internet, such as IP (Internet protocol), TCP (Transmission Control Protocol), HTTP (Hypertext Transfer Protocol) and FTP (File Transfer Protocol), and also includes specification and requirements of a variety of technologies regarding the Internet. The RFC is published with a serial number, such as the foregoing RFC2298.

Japanese Unexamined Patent Publication No. 309109/2001 (published on Nov. 2, 2001) discloses an internet fax (a network communication device) having the described MDN function. This internet fax outputs a record of failure of transmission to the user when a MDN response e-mail is not sent from the receiving end after a certain period of time after completion of transmission, so as to inform the user that delivery of the MDN response (transmission confirmation response) has not been made.

With this function, it is possible to confirm whether or not the transmission is properly completed in the receiving end terminal.

However, the foregoing MDN function is not a compulsory function of a network communication device for carrying out communication via a network. Accordingly, the receiving end terminal is not always provided with the MDN function.

Thus, in the configuration requiring the MDN function at each time of communication as with the internet fax disclosed in the foregoing publication, if the receiving end terminal is not provided with the MDN function, the sending end unnecessarily has to wait for the MDN response since the receiving end terminal will not send the MDN response even when transmission of the e-mail is properly completed.

Further, since the receiving end terminal is not provided with the MDN function, the sending end terminal will output an unnecessary record of failure of transmission even when the transmission is completed in the receiving end terminal.

BRIEF SUMMARY

A network communication device prevents unnecessary waiting for a transmission confirmation response, or unnecessary output of a record of failure of transmission.

In order to solve the foregoing problems, a network communication device according to the present technology with a transmission confirmation response function which allows a user to confirm completion of data transmission to a receiver by receiving a transmission confirmation response from the receiver after completion of the data transmission via a network, also includes: input means for inputting transmission information regarding the receiver at the data transmission, so as to carry out the data transmission, the transmission information including information indicative of whether or not the transmission confirmation response is required.

Generally, the transmission confirmation response function (MDN function) is not a compulsory function of a network communication device for carrying out communication via a network. Accordingly, the network communication device of the receiver is not always provided with the MDN function.

However, in the foregoing configuration, the user inputs the receiver information, which includes the information indicative of whether or not the transmission confirmation response is required, at the time of data transmission. Thus, it is possible to input the information so that the transmission confirmation is not required (the setting of transmission confirmation is "No") when the network communication device of the receiver is not provided with the MDN function.

On this account, even when the device of the receiver is not provided with the MDN function, it is possible to prevent unnecessary waiting time for transmission confirmation (waiting time for a transmission confirmation response) or an unnecessary output of a record of failure of transmission. Also, it is possible to prevent unnecessary data resending as a result of absence of the data transmission confirmation even though the data transmission is completed in the destination.

Further, a network communication device according to the present technology with a transmission confirmation response function which allows a user to confirm completion of data transmission to each of receivers by receiving a transmission confirmation response from the receiver after completion of the data transmission via a network, further includes: storing means for storing transmission information regarding each receiver, so as to carry out the data transmission, transmission information including information indicative of whether or not the transmission confirmation response is required.

With the foregoing configuration, since the storing means stores transmission including information of whether or not the transmission confirmation response is required, it is possible to previously set the requirement of the transmission confirmation so that the transmission confirmation is not required when the network communication device of the receiver is not provided with the MDN function.

On this account, it is possible to prevent unnecessary waiting time for transmission confirmation response or unnecessary output of a record of failure of transmission. Further, even when the destination terminal does not provided with the MDN function, it is possible to prevent unnecessary resending of the same data as a result of absence of the data transmission confirmation even though the data transmission is completed in the destination.

Further, by having the storing means, it is possible to ease input operation of the user for inputting the transmission information at each time of transmission.

Further, in order to solve the foregoing problems, in a network communication device according to the present technology with a function as a network facsimile device for carrying out sending and receiving of data via a network, and a function of requesting for transmission confirmation response when sending the data, the device is capable of also setting information indicative of whether or not the transmission confirmation response is required according to a receiver.

With the foregoing configuration, the device is capable of setting information of whether or not the transmission confirmation response is required according to a receiver. Therefore, when the network communication device of the receiver is not provided with the MDN function, the setting of the transmission confirmation is modified so that the transmission confirmation response is not required.

On this account, it is possible to prevent unnecessary waiting time for transmission confirmation response or unnecessary output of a record of failure of transmission. Further, it is possible to prevent unnecessary resending of the same data as a result of absence of the data transmission confirmation even though the data transmission is completed in the destination.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 8 is a drawing showing an example of the receiver information.

FIGS. 10(a) through 10(c) are drawings showing a flow of input screen when information required for transmitting e-mail is inputted through a one-touch key by using the receiver information.

DESCRIPTION OF THE EMBODIMENTS

The following will explain one embodiment of the present invention with reference to FIGS. 1 through 13(c).

In addition to its function as a printer/photocopier for printing data on a recording medium or as a general facsimile (fax) using a telephone line, a facsimile/e-mail device, which is a network communication device of the present technology, has a function as an e-mail (FTP (File Transfer Protocol) device which carries out sending/receiving of e-mail and also sending/receiving of files with a server via a network such as the Internet, and also has a function as an internet facsimile device (hereinafter referred to as an internet fax). The function as an internet facsimile device (network facsimile device) will be described later.

Figure 1:
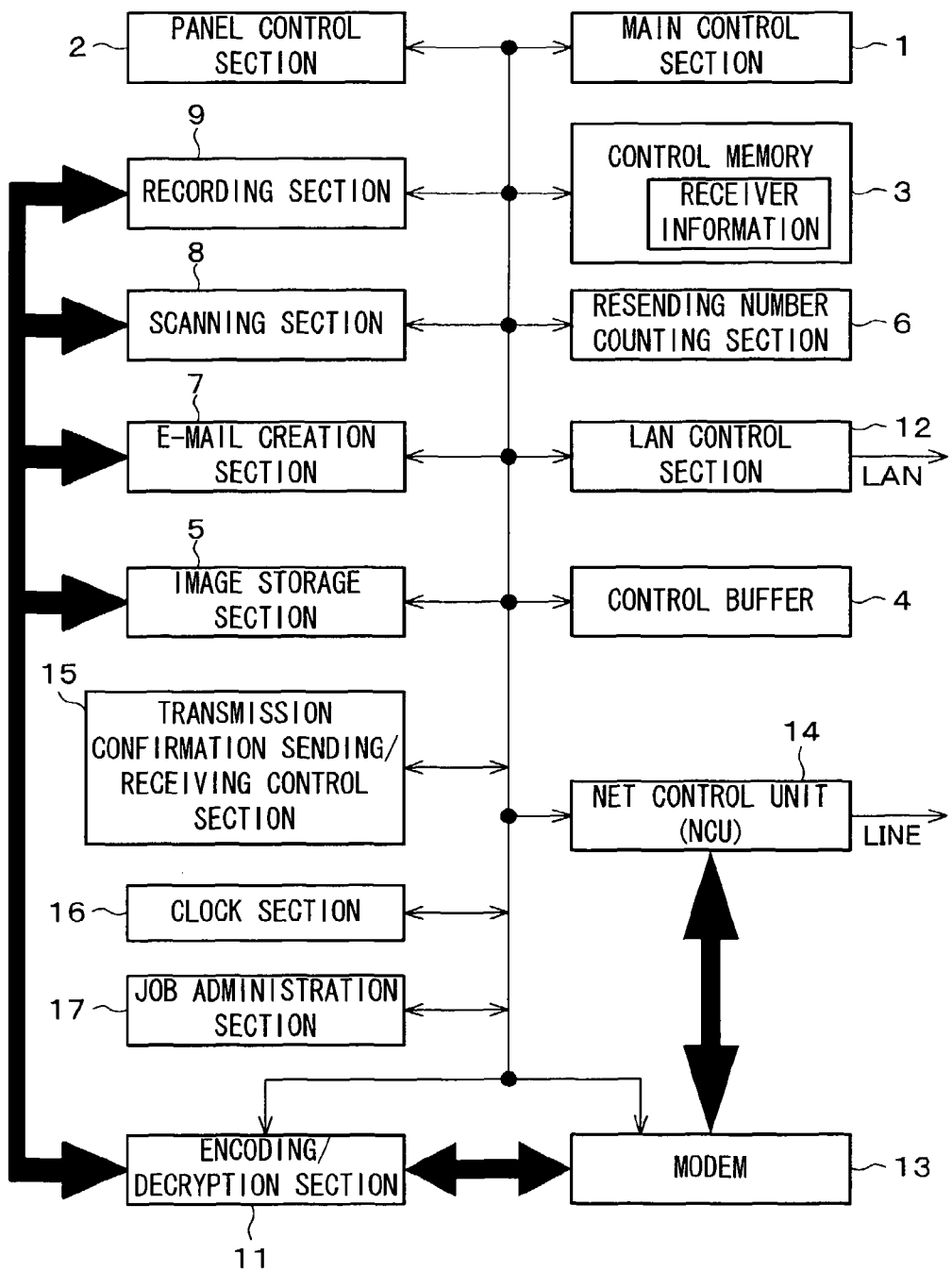
FIG. 1 is a block diagram showing an arrangement of a facsimile/e-mail device according to one embodiment.

FIG. 1 is a block diagram showing an arrangement of a facsimile/e-mail device. The facsimile/e-mail device includes a main control section 1, a panel control section (inputting means, informing means) 2, a control memory 3, a control buffer 4, an image storage section 5, a resending number counting section 6, an e-mail creation section 7, a scanning section 8, a recording section 9, an encoding/decryption section 11, a LAN (Local Area Network) control section 12, a modem 13, a net control unit (NCU: Network Control Unit) 14, a transmission confirmation sending/receiving control section 15, a clock section 16, and a job administration section 17.

The main control section 1 includes a CPU (Central Processing Unit) etc. and operates to control the main body of the facsimile/e-mail device.

The panel control section 2 is used for instructions such as scanning of documents, or inputing of an address of the other party (receiver). The panel control section 2 includes a display section and an operation section (both not shown) and displays a screen. The display section can be a LCD (Liquid Crystal Display), a CRT (Cathode Ray Tube) display or the like, which displays condition of operation, the destination of sending or the like. The operation section includes keys (inputting means) used for operation.

The panel control section 2 of the present embodiment is a touch-panel including both the display section and the operation section therein. The arrangement of the panel control section 2 will be described later. The touch-panel of the panel control section 2 is used for inputting (setting) receiver information (information with respect to the other party of communication). The receiver information (transmission information with respect to the receiver) thus set by the panel control section is stored in the control memory (storing means) 3.

The control memory 3 comprises either of a nonvolatile memory, or a volatile memory with back-ups, such as a ROM (Read Only Memory). The control memory 3 stores control program or information regarding the receiver (transmission information of the receiver).

The control buffer 4 comprises a RAM (Random Access Memory) and stores required data for operating the program.

The image storage section 5 stores encoded image data (data), and also stores such as data scanned from the scanning section 8 (described later), received data, data after decryption etc.

The resending number counting section 6 counts number of resending in case of resending e-mail due to sending error.

The e-mail creation section 7 adds header information to the encoded image data and converts the data into e-mail format.

The scanning section 8 scans a document as a document image of predetermined resolution by using a scanner with a CCD (Charge Coupled Device), which is provided as document scanning means. Then, as a result of scanning, the scanning section 8 outputs dot image data.

The recording section 9 includes a printing device of electrophotography mode, and makes a hard copy of (prints out) data such as documents received through communication.

The encoding/decryption section 11 carries out encoding of the scanned document data or decryption of data at the receiving. More specifically, the encoding/decryption section 11 carries out encoding and compression of an image signal and also carries out decryption of image information (data) which has been encoded and compressed, so as to restore the image information to the original image signal. The encoding/decryption section 11 may adopt an encoding mode of such as MH (Modified Huffman), MR (Modified READ) and MMR (Modified Modified READ), which are general encoding modes for facsimile communication.

The LAN control section 12 is provided so as to be connected to a LAN (Local Area Network) for carrying out sending/receiving communication of e-mail via the Internet and for carrying out communication of an internet facsimile.

The modem 13 operates to carry out general facsimile communication and is made up of a facsimile modem capable of facsimile communication. The modem 13 is connected to a telephone line via the net control unit 14.

The net control unit (NCU: Network Control Unit) 14 is connected to a telephone line, and performs control of the line. The net control unit 14 is a hardware performing closing/opening operation of the line with respect to an analog public telephone line network (PSTN), and connects the modem 13 to the analog public telephone line network according to the condition of the communication.

The transmission confirmation sending/receiving control section 15 operates to carry out request for transmission confirmation (transmission confirmation response) and to manage the result of a received transmission confirmation response. The transmission confirmation sending/receiving control section 15 performs the control operation by using header information which is added by the e-mail creation section 7.

The clock section 16 measures elapsed time; for example, it counts timeout period (described later).

The job administration section 17 operates to administrate job condition, for example, at transmission starting operation, transmission operation, or resending operation (all described later).

Figure 7:
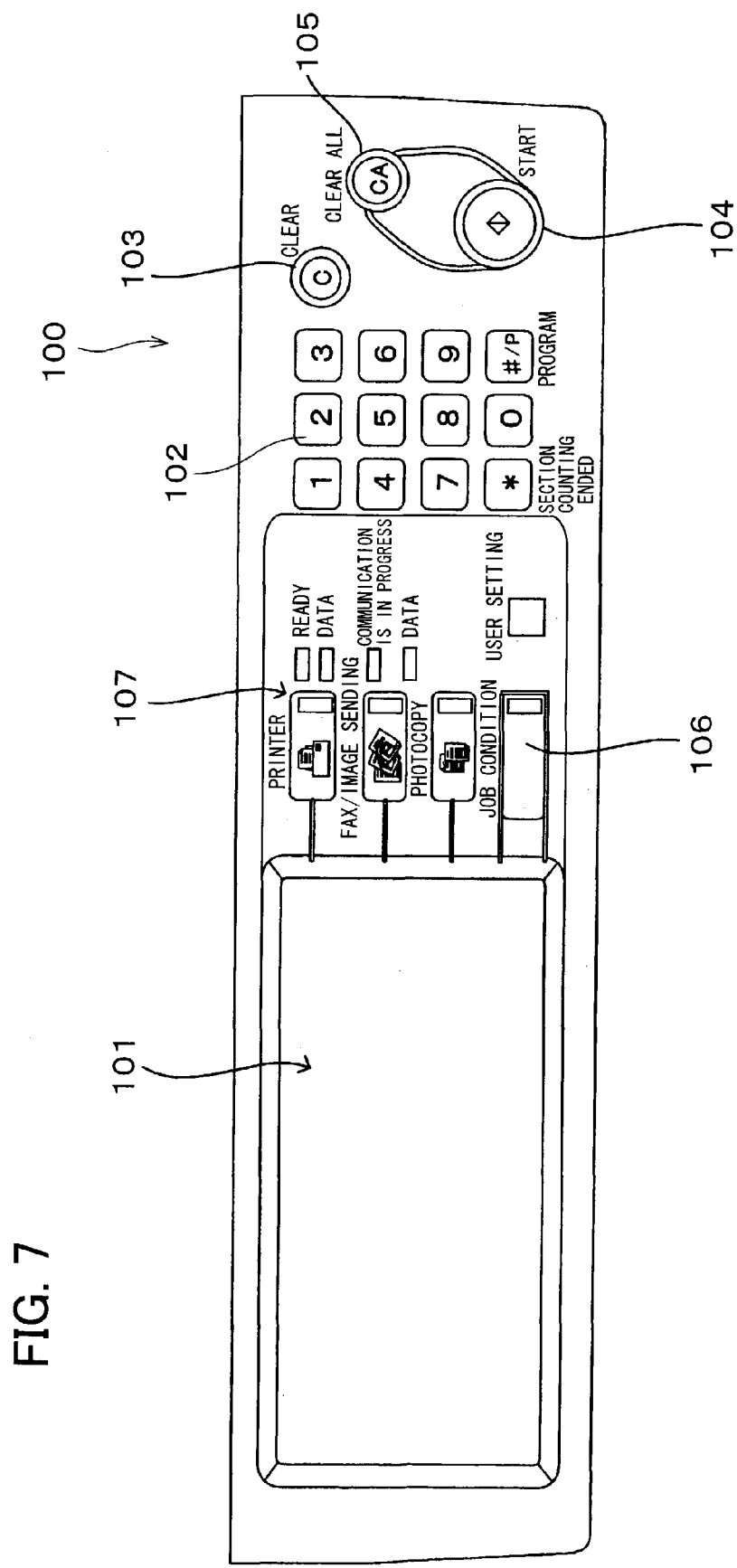
FIG. 7 is a drawing showing an arrangement of panel control section.
Figure 9:
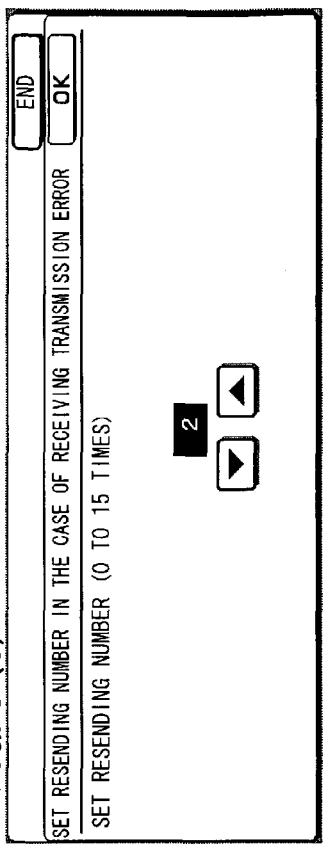
FIGS. 9(a) through 9(e) are drawings showing a flow of input screen when information required for transmitting e-mail is directly inputted through a touch panel at the transmission starting operation.
Figure 9:
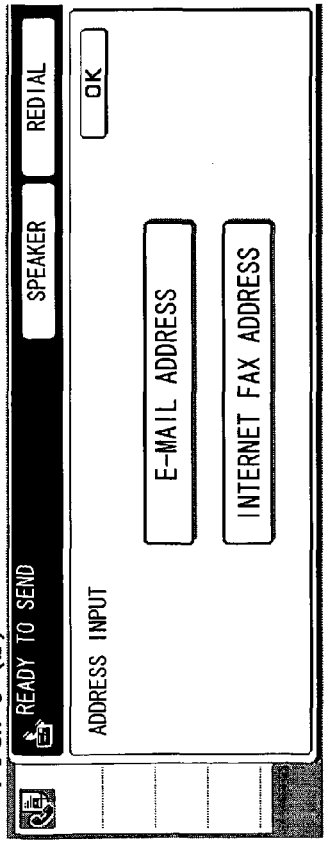
Figure 9:
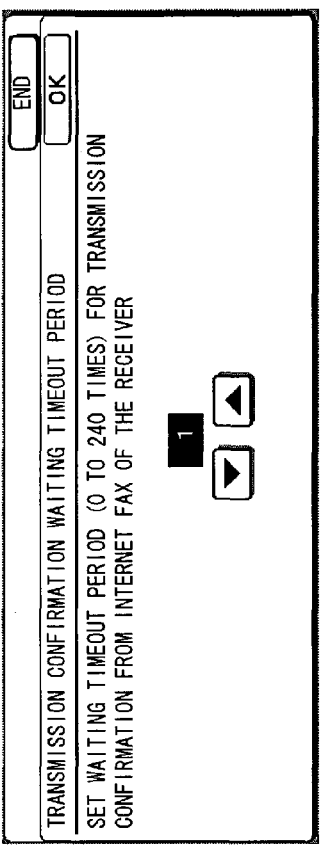
Figure 9:
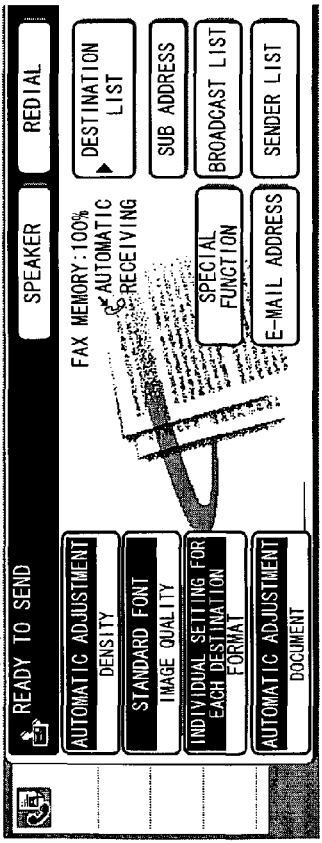
Figure 9:
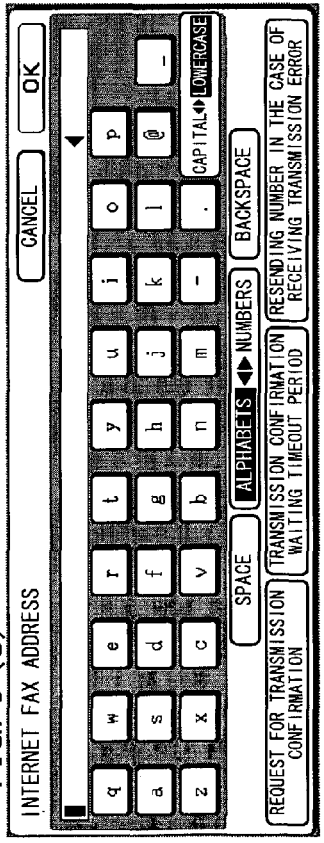

Next, the following will explain an arrangement of the panel control section 2 with reference to FIG. 7.

As shown in the figure, the panel control section 2 includes an operation section 100 and a display section 101. The display section 101 comprises a liquid crystal display panel and is capable of displaying not only numbers and symbols but also images. Since the display section 101 is a touch-panel, it makes the input operation easier, and also it simplifies the key arrangement of the operation section 100. Therefore, the configuration of the operation section 100 can be simplified.

The operation section 100 allows a user to input various instructions such as condition setting or processing operation with respect to the facsimile/e-mail device. The operation section includes numeric keys 102, a clear key 103, a start key 104, a clear all key (CA key) 105, a mode selection key subsection 107, and a job status display key 106.

The numeric keys 102 are used for inputting such information as the required number of copies of image forming. The clear key 103 is used for clearing information, such as information inputted from the numeric keys 102.

The start key 104 is a key for starting image outputting operation with respect to a recording medium. The clear all key 105 is a key for clearing all of the set conditions.

Further, the mode selection key subsection 107 includes keys (printer key, fax/image sending key, copy key) for selecting one of the various modes, such as a printer mode to use the device as a printer for outputting data received via the Internet, a facsimile mode as a facsimile device for sending data to the other devices via a telephone line or the Internet, or a photocopy mode as a photocopier for printing image data scanned from a recording medium to another recording medium, for example. The user selects the function of the facsimile/e-mail device by selecting one of these keys.

The job status display key 106 is used for selecting and displaying the current job condition of image forming.

The following will explain a function of the facsimile/e-mail device as an internet fax device (network facsimile device).

When the facsimile/e-mail device is used as an internet fax device for sending facsimile document data (data, image data), the facsimile document data is encoded by the encoding/decryption section 11, and then supplied with header information by the e-mail creation section 7 so as to be converted into e-mail format.

More specifically, the internet fax device puts the facsimile document data and the destination e-mail address (address) of the facsimile document data together so as to convert the data into e-mail. Then, the internet fax device is connected to a provider of the Internet via a telephone line, then further connected to the Internet via the host computer of the Internet provider or is directly connected to the Internet so as to transfer the e-mail to a mail server on the network.

Then, sending and receiving of e-mail are carried out between an internet fax of the sending end (the facsimile/e-mail device, sending end terminal) and an internet fax of the receiving end (another facsimile/e-mail device connected to the Internet, sending end terminal, receiving end terminal), which are both connected to the Internet.

The facsimile/e-mail device has a MDN (Message Disposition Notification) function which informs processing condition of the message after completion of delivery of the message. The MDN function is a function (transmission confirmation response function) for carrying out transmission confirmation by sending back a transmission confirmation response from a receiving end terminal (receiving end internet fax device) to a sending end terminal when e-mail is transmitted to the receiving end terminal.

In the facsimile/e-mail device of the present embodiment, request for transmission confirmation (request for transmission confirmation response) is carried out by providing a MDN field in the header section of e-mail, and then writing the address (the address or the number of the sending end terminal) of the destination where the confirmation mail is to be sent in that MDN field. More specifically, the MDN field (header information) is added in the e-mail creation section 7 to be used by the transmission confirmation sending/receiving control section 15.

Figure 2:
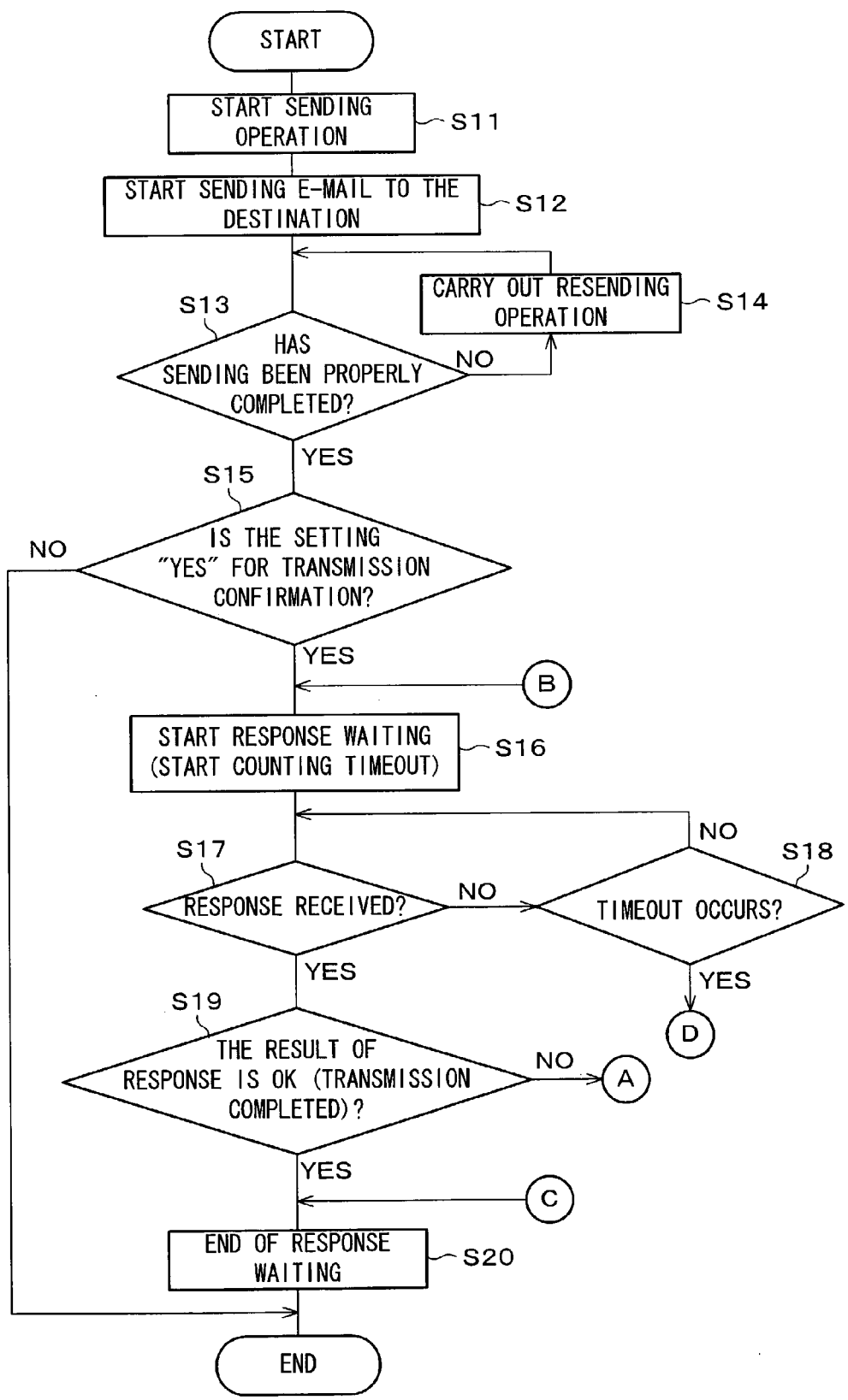
FIG. 2 is a flow chart showing an example of e-mail transmission operation of the facsimile/e-mail device.
Figure 3:
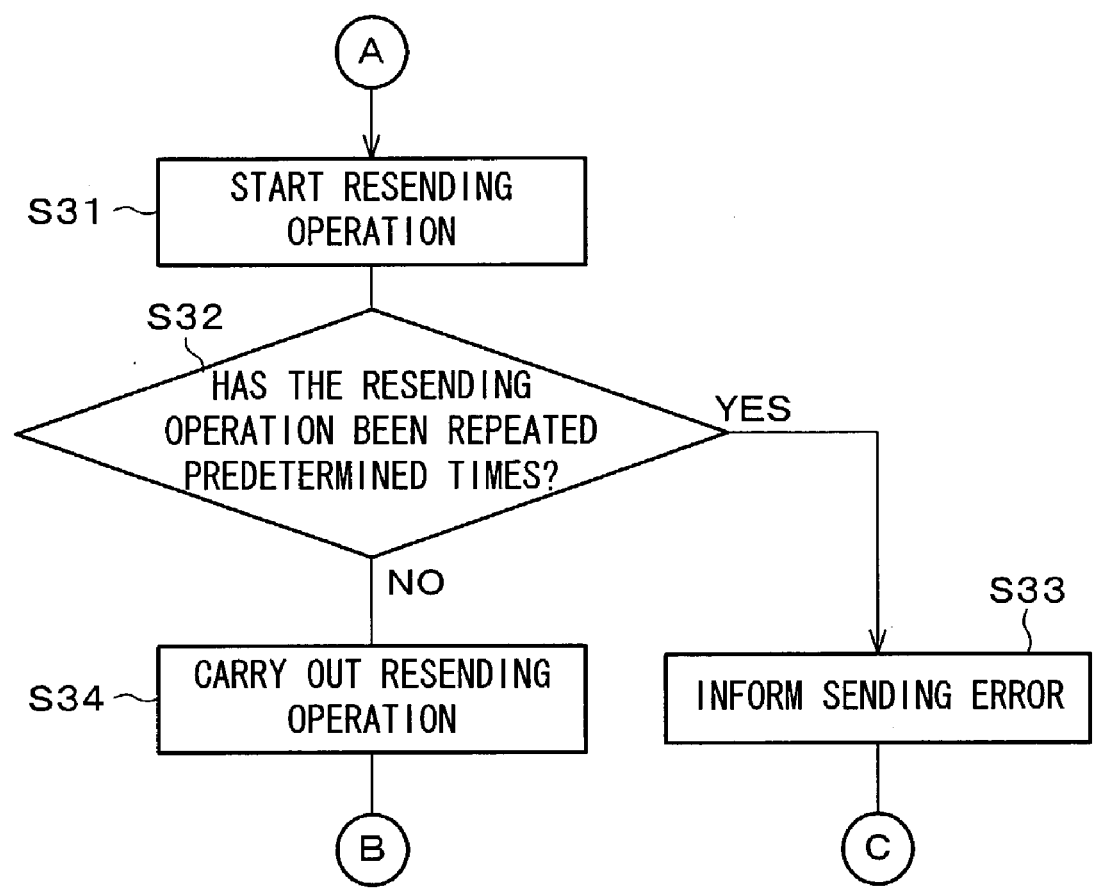
FIG. 3 is a flow chart showing resending operation in the foregoing transmission operation.
Figure 4:
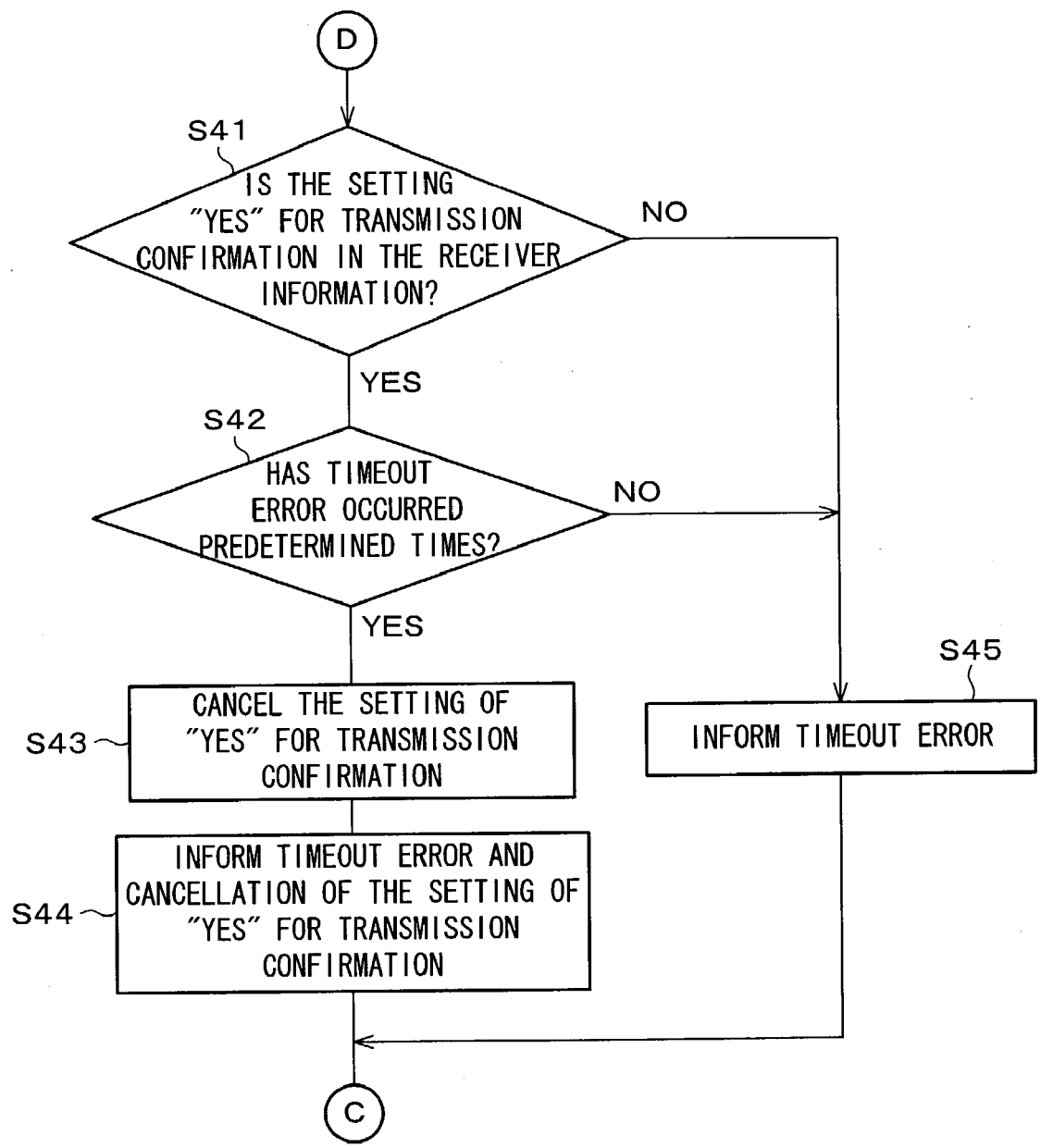
FIG. 4 is a flow chart partly showing the transmission operation when a timeout occurs without receiving a response.

Next, with reference to FIGS. 2 through 4, the following will explain transmission operation of the sending end internet fax device for sending facsimile document data as e-mail to the receiving end internet fax device.

As shown in FIG. 2, firstly, the sending end internet fax device (the facsimile/e-mail device) starts transmission operation (S11) by being connected to the Internet and then sending e-mail to the receiving end internet fax device (receiver) (S12).

Then, when the sending end internet fax device fails to properly transmit the e-mail (No in S13), the sending end internet fax device resends the e-mail (S14).

Meanwhile, when the sending end internet fax device succeeds to properly transmit the e-mail (Yes in S13), and requirement of transmission confirmation with respect to the destination receiving end internet fax device is set to "No" in the sending end internet fax device (No in S15), the transmission operation is completed at this stage.

The receiving end internet fax device, setting of whether or not the transmission confirmation is provided (necessary) is previously included in receiver information in the control memory 3 respectively for each receiver, as it will be described later. Further, the address or the number of the receiver (transmission information) is included in the receiver information in the state of an abbreviated number. Namely, the data transmission operation can be started by inputting an abbreviated number corresponding to the address or the number of the destination by a user.

Transmission information including the address or the number of the destination, setting of whether or not the transmission confirmation is provided, and number of resending operation (described later) is not necessarily required to be previously stored as the receiver information, and these kinds of transmission information may be set by directly inputting at each time of data transmission.

Further, when the sending end internet fax device succeeds in properly transmitting the e-mail (Yes in S13), and the requirement of transmission confirmation with respect to the destination receiving end internet fax device is set to "Yes" in the sending end internet fax device (Yes in S15), the sending end internet fax device starts waiting for the response (this operation will hereinafter be referred to as "response waiting") due to its MDN function. Namely, the fax device starts counting a timeout period (a waiting time for the transmission confirmation) in the clock section 16 (S16).

Further, when the transmission confirmation response is sent from the receiving end internet fax device (Yes in S17), and when the response says that the receiving end internet fax device has succeeded in receiving the e-mail, i.e., the result of response is "OK" (the sending is completed) (Yes in S19), the response waiting operation is ended (S20), and the transmission operation is completed.

The sending end internet fax device keeps waiting for the response until the end of the timeout period (a maximum time period for waiting for the receipt of the transmission confirmation response)(No in S17, No in S18).

Further, even when the response is received, when the response says that the receiving end internet fax device fails to properly receive the e-mail (the receiving end internet fax device fails to complete the receipt of the e-mail which has been sent from the sending end internet fax device)(No in S19), the sending end internet fax device starts resending operation of the e-mail (S31) as shown in FIG. 3.

If the resending operation has not been repeated a predetermined number of times, which number is previously decided as the receiver information (No in S32), the sending end internet fax device carries out the resending operation again (S34), and the sequence returns to the response waiting (S16).

Meanwhile, when the resending operation has repeated the foregoing predetermined number of times (Yes in S32), the user is informed sending error via the panel control section 2 (S33), and the response waiting is ended (S20), and the transmission operation is completed.

Further, when timeout occurs without receiving the response (in case of timeout error)(Yes in S18), as shown in FIG. 4, if the setting of transmission confirmation was set to "Yes", i.e., if the destination is stored in the state of an abbreviated dialing number (Yes in S41), the setting of transmission confirmation is modified to "No" (the setting of "Yes" is cancelled) (S43) at the time of the predetermined numbered timeout error, which number was decided in advance as the receiver (destination) information.

Further, the user is informed that the timeout error has repeated predetermined times, and therefore the setting of transmission confirmation is modified to "No", via the panel control section 2 (S44), and the response waiting is ended (S20), and the transmission operation is completed.

Meanwhile, when the setting of transmission confirmation is "No" as the receiver (destination) information (No in S41), i.e., when the destination is not stored in the state of an abbreviated dialing number so that the destination e-mail address is directly inputted by the user via the panel control section 2, or, when the setting of transmission confirmation is "Yes" as the receiver (destination) information but the timeout error has not occurred the predetermined times (No in S42), the user is informed that the timeout error has repeated predetermined times, and therefore the setting of transmission confirmation is modified to "No", via the panel control section 2 (S45), and the response waiting is ended (S20), and the transmission operation is completed.

The predetermined number for counting the timeout error is set as a limit of occurrence of timeout error before cancelling the setting of transmission confirmation of "Yes", when data transmission is repeated some times and the all transmission result in timeout error. Accordingly, the setting of transmission confirmation of "Yes" is cancelled when timeout error has occurred the predetermined times.

Incidentally, before the transmission operation (thus described as the sending end internet fax device sending facsimile document data as e-mail to the receiving end internet fax device), a transmission starting operation has to be carried out at the first step.

Figure 5:
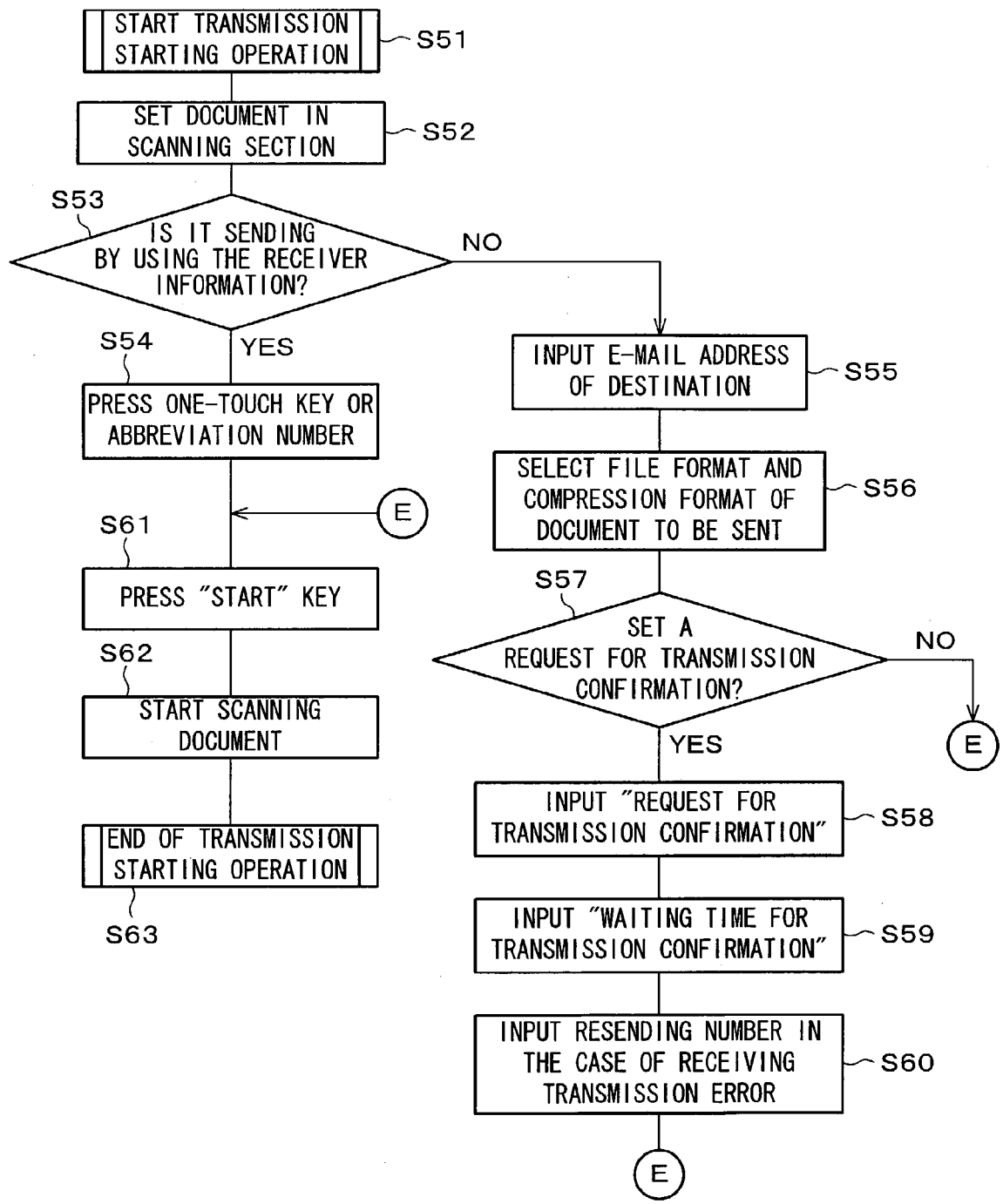
FIG. 5 is a flow chart showing an example of transmission starting operation.

The following will explain an example of the transmission starting operation with reference to FIG. 5. Firstly, a document to be sent as e-mail is set on the scanning section 8 (S51, S52).

When using the receiver information stored in the control memory 3 (Yes in S53), the abbreviated number as the receiver information is inputted by push-button input, or by one-touch key input (S54). An example of the receiver information will be described later.

The push-button input of the abbreviated number is input operation by sequentially pressing keys of "0", "0", "9" of the number keys 102 included in the operation section 100 shown in FIG. 7 when the destination is stored in the state of an abbreviated number of "009", for example, in the control memory 3.

Further, the one-touch key input is inputting operation by sequentially touch directly the numbers of "0", "0", "9" displayed in the touch panel of the display section 101 shown in FIG. 7.

Next, when the user presses the start key 104 shown in FIG. 7 (S61), scanning of the document set on the scanning section 8 is started (S62). Then, when the scanning of the document is completed, the transmission starting operation is completed (S63).

Meanwhile, in case of not using the receiver information (No in S53), the destination e-mail address is directly inputted through, for example, the touch-panel of the display section 101 shown in FIG. 7 (S55).

Further, a file format of the sending document, such as TIFF or PDF, and also the compression format of the document, such as MH or MMR, are selected (S56).

If the user intends to select "No" as the setting of transmission confirmation (No in S57), the start key 104 is pressed (S61).

On the other hand, if the user intends to select "Yes" as the setting of transmission confirmation (Yes in S57, S58), the user inputs the described timeout period (transmission confirmation waiting time) (S59). Then, the user inputs number of resending (predetermined number) in the case where the receiving end internet fax device sends a response to inform failure of receipt of the e-mail (S60), and then presses the start key 104 (S61).

With reference to FIGS. 9(a) through 9(e), the following will explain an example of an input screen in case of directly inputting described information, (information required for e-mail sending, transmission information), i.e., destination e-mail address, requirement of transmission confirmation, timeout period, and number of resending operation, through the touch-panel (one-touch key input).

Firstly, in step S55, the user touches the "Address input" key of the input screen shown in FIG. 9(a), and then touches the "internet fax address" key of the input screen shown in FIG. 9(b).

Then, when the input screen shown in FIG. 9(c) is displayed, the user inputs the destination e-mail address by touching keys such as the alphabet keys.

Next, after inputting the e-mail address, the user touches the "OK" key when the setting of transmission confirmation is "No", and finishes the input operation.

On the other hand, to select "Yes" as the setting of transmission confirmation after inputting the e-mail address, the setting may be performed by touching the "Request for transmission confirmation" key of the input screen shown in FIG. 9(c).

Further, when the user touches the "Transmission confirmation waiting timeout period" key of the input screen shown in FIG. 9(c), the input screen shown in FIG. 9(d) appears so as to allow the user to set the timeout period from 1 to 240 hours in step S59.

Further, when the user touches the "Resending number in the case of receiving transmission error" key of the input screen shown in FIG. 9(c), the input screen shown in FIG. 9(e) appears so as to allow the user to set the number of resending operations from 0 to 15 times in step S60.

When respective settings are completed in the input screens shown in FIGS. 9(d) and 9(e), the user touches the "OK" key provided on upper right of the input screen so as to finish the input operation.

Further, when the foregoing information, such as destination e-mail address, file format and compression format of the sending document, requirement of transmission confirmation, timeout period, and number of resending operation (transmission information) are previously stored as the receiver information, these kinds of information are stored in the control memory 3 as with the example shown in FIG. 8.

As shown in FIG. 8, the abbreviated keys "001", "002" . . . are respectively used for different destinations, and each of which includes the names and the e-mail addresses of the receivers corresponding to each abbreviated number.

Further, each abbreviated number may also have setting of file format of the document such as TIFF or PDF, compression format of the document such as MH or MMR, requirement of transmission confirmation ("Yes" or "No" as the setting of transmission confirmation), timeout period (transmission confirmation waiting time), and number of resending operation (number of resending when receiving transmission error).

The timeout period has been described as being selected from 1 to 240 hours, and the number of resending has been described as selected from 0 to 15 times. However, the present invention is not limited to these arrangements.

With reference to FIGS. 10(a) through 10(c) and FIGS. 12(a) through 12(f), the following will explain an example of a input screen (panel control section 2) used for storing the foregoing receiver information by one-touch key input. The following example uses the abbreviated number of "001".

In the input screen shown in FIG. 10(a), the user selects the "Internet fax" key. Then, the user carries out input of the name of the receiver and a query character used for searching for the name of the receiver. FIG. 12(a) shows an input screen for inputting the name of the receiver and FIG. 12(b) shows an input screen for inputting the query character.

Further, when the user selects the "Index" key in the input screen shown in FIG. 10(a), the input screen shown in FIG. 12(c) appears, which allows the user to select an index name of the receiver to be stored. In this example, each destination of the receiver may be stored in separate 6 indices (users 1 through 6). Further, a frequent destination for sending/receiving may also be stored in the index of "client".

Further, when the user selects the "Address" key in the input screen shown in FIG. 10(a), the input screen shown in FIG. 12(d) appears, which allows the user to input the e-mail address of the destination to be stored. Also, when the user selects the "Key name" key, the input screen shown in FIG. 12(e) appears, which allows the user to input a key name of the destination to be stored.

Further, when the user selects the "Compression format" key in the input screen shown in FIG. 10(a), the input screen shown in FIG. 12(f) appears, which allows the user to select a compression format of the e-mail to be sent to the stored destination. MH format is selected in this example.

Further, when the user touches the "Request for transmission confirmation" key in the input screen shown in FIG.

10(*a*), the transmission confirmation is set to "Yes". Further, when the user touches the "Transmission confirmation waiting timeout period" key in the input screen shown in FIG. 10(*a*), the input screen shown in FIG. 10(*b*) appears, which allows the user to set the timeout period from 1 to 240 hours. Further, when the user touches the "Resending number in the case of receiving transmission error" key in the input screen shown in FIG. 10(*a*), the input screen shown in FIG. 10(*c*) appears, which allows the user to set the number of resending operation from 0 to 15 times.

Figure 6:
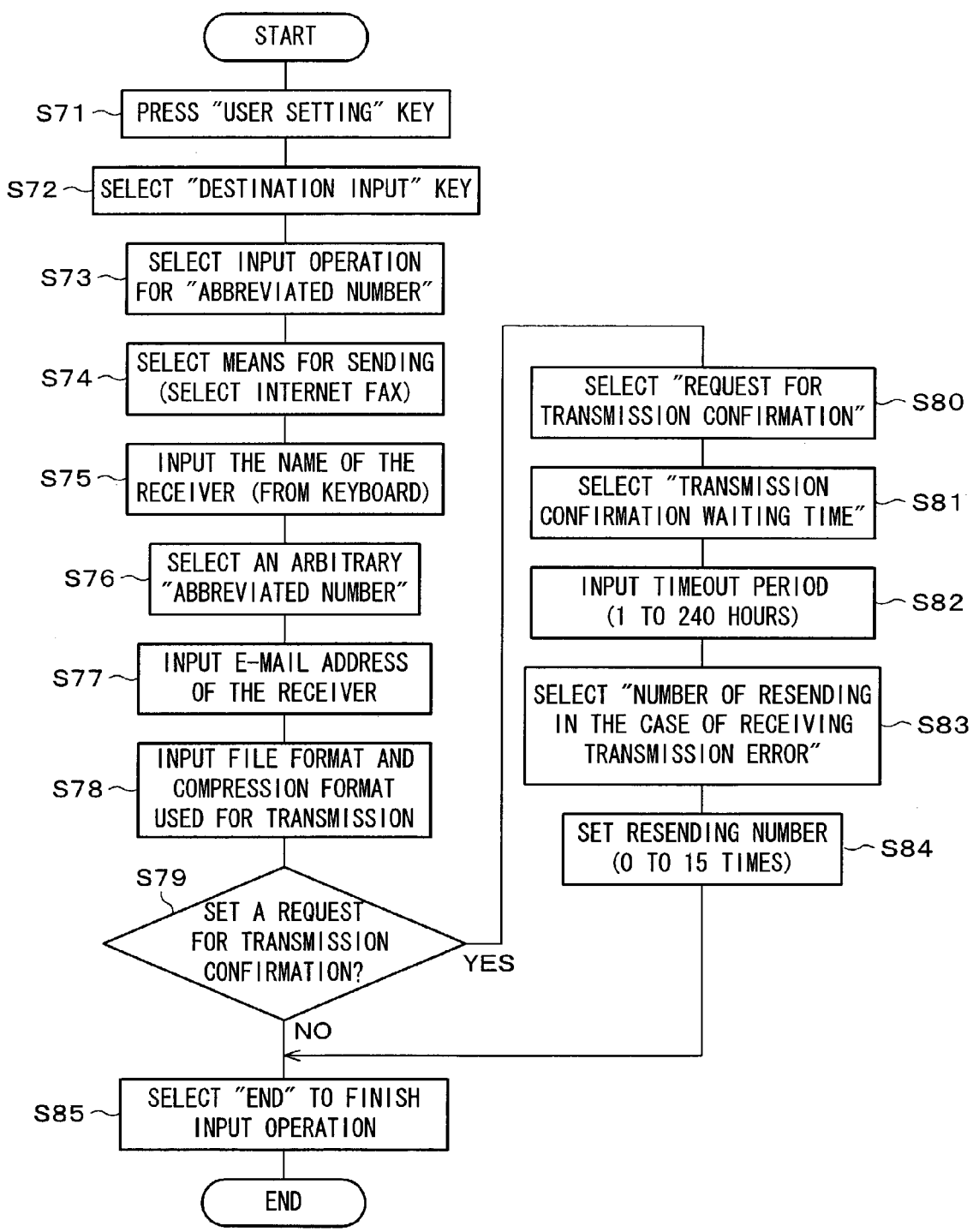
FIG. 6 is a flow chart showing input operation of receiver information.

The following will explain an example of input operation of receiver information with reference to the flow chart shown in FIG. 6.

Firstly, the user presses "User setting" key (S71), and then selects (touches) "Destination input" key (S72), and further selects "Abbreviated number" key (S73). With this operation, the input screen described above appears.

Next, the user selects transmission means (function to be used), i.e., the user selects an internet fax in this example (S74). Then, the user inputs the name of destination (receiver) by using keys (S75), and then selects an "Abbreviated number" key in which the destination is to be stored (S76).

Next, the user inputs the e-mail address of receiver (S77) and further inputs a file format and a compression format of the transmission document (S78).

Thereafter, if the user intends to select "No" as the setting of transmission confirmation (No in S79), the user selects "End" to finish the input operation (S85) so as to finish the input operation of an abbreviated number.

On the other hand, if the user intends to select "Yes" as the setting of transmission confirmation (Yes in S79), the user selects "Request for transmission confirmation" key (S80).

Further, the user selects "Transmission confirmation waiting timeout period" key (S81) so as to input the timeout period (S82). Further, the user selects "Resending number in the case of receiving transmission error" key (S83) so as to input the resending number (S84). Then, the user selects "End" of the input operation (S85) so as to finish the input operation of an abbreviated number.

Figure 11:
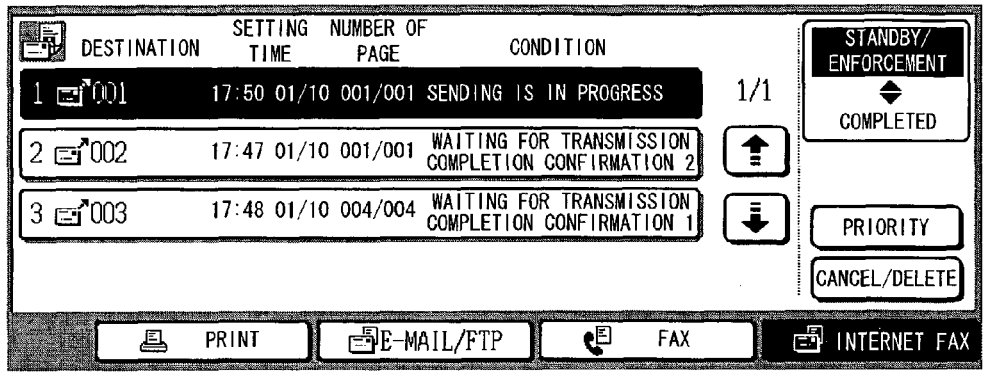
FIGS. 11(a) through 11(d) are drawings showing a flow of a job condition display screen.
Figure 11:
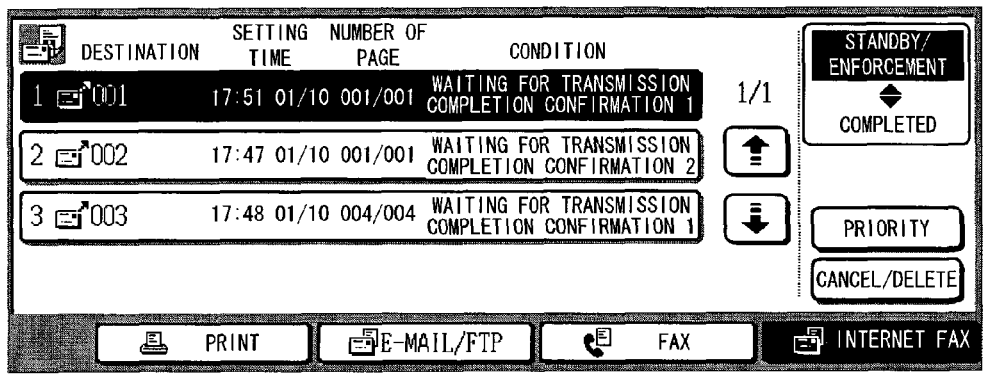
Figure 11:
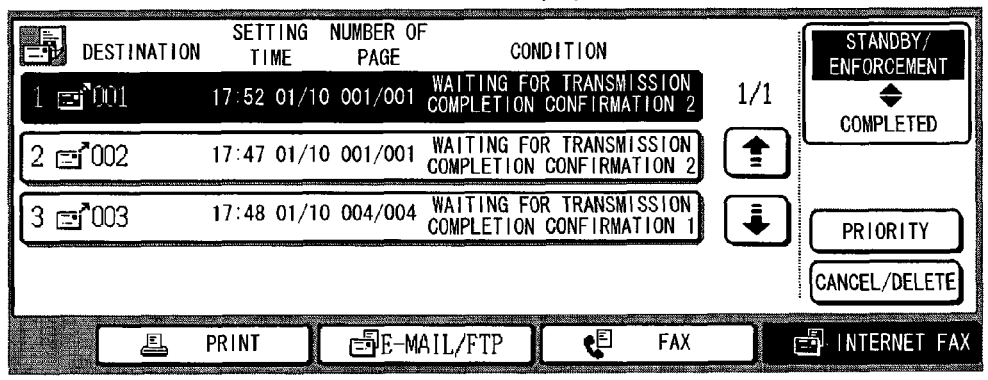
Figure 11:
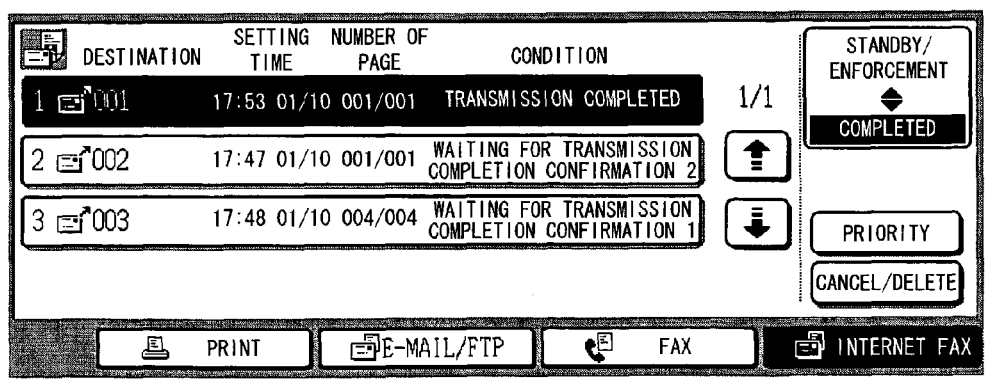
Figure 12:
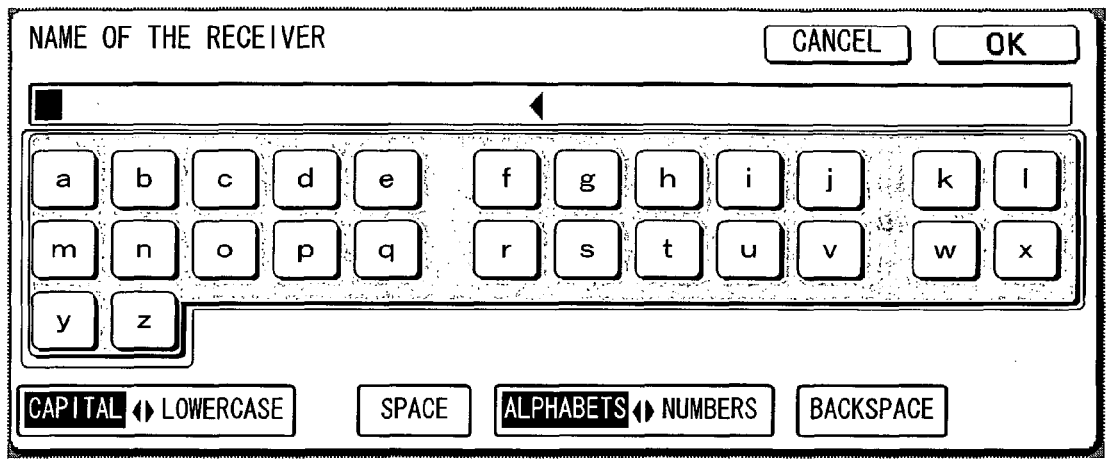
FIGS. 12(a) through 12(f) are drawings showing an input screen for inputting the receiver information.
Figure 12:
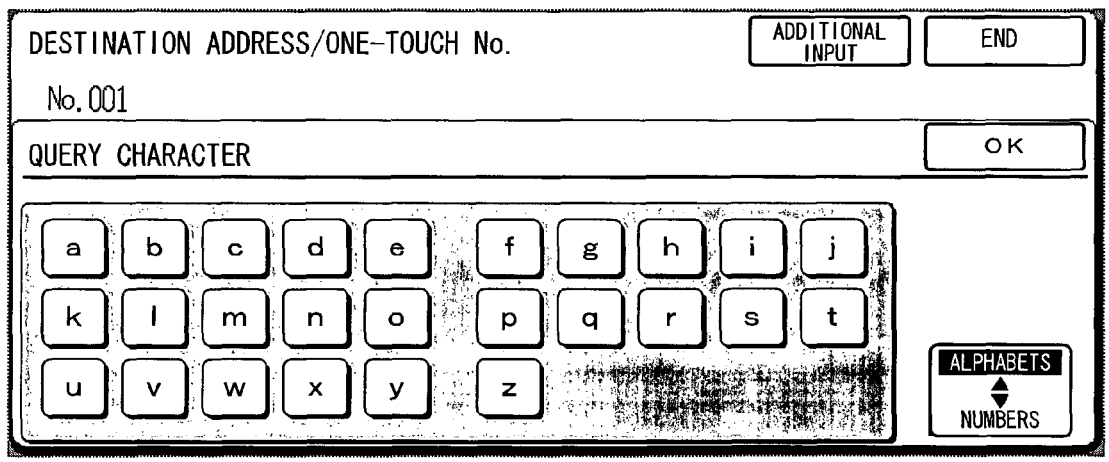
Figure 12:
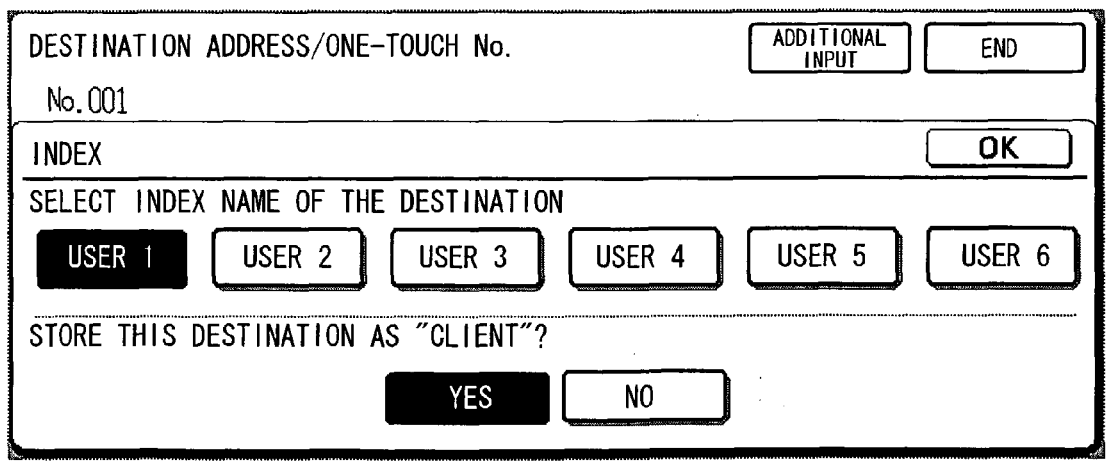
Figure 12:
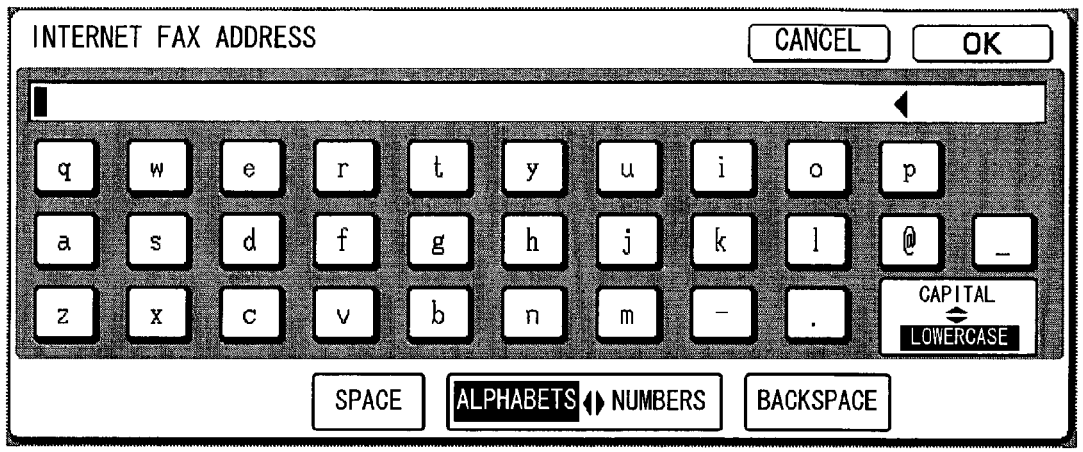
Figure 12:
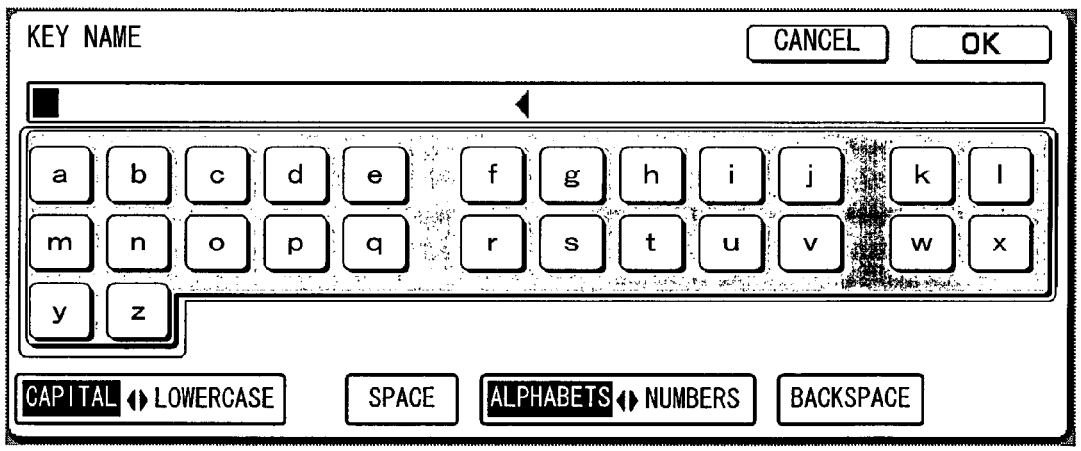
Figure 12:
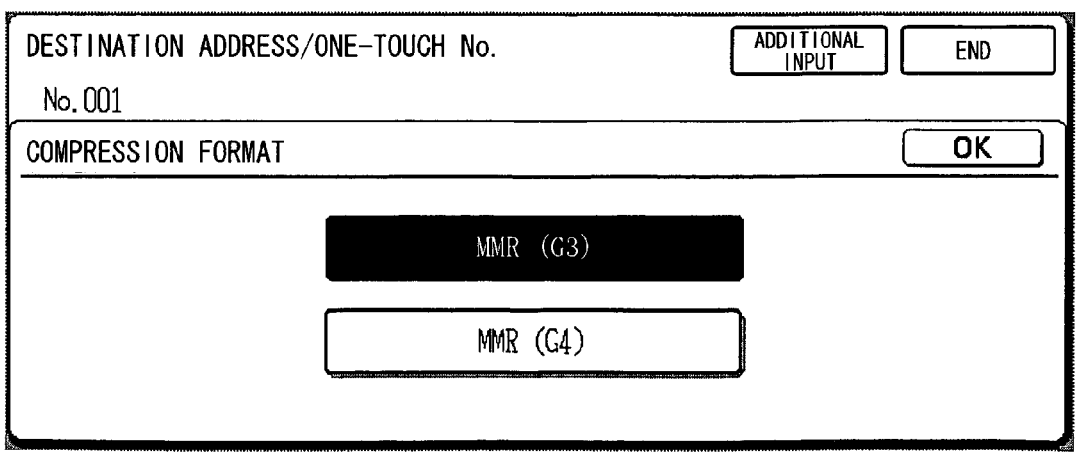

Further, the following will explain a job condition display screen with reference to FIGS. 11(*a*) through 11(*d*). By pressing a job status display key 106 (see FIG. 7), the current job condition appears on a screen in the display section 101 (see FIG. 7).

A conventional job condition display screen only displayed job condition of whether the transmission of e-mail is in progress or is on standby, regardless of the presence or absence of the MDN function.

On the other hand, in the job condition display screen of the facsimile/e-mail device described herein, display content changes according to the communication condition of the transmission confirmation job (job condition). With this function, it is possible to inform the user of the communication condition of the transmission confirmation job (job condition in the MDN function).

For example, the job condition display screen shown in FIG. 11(*a*) indicates that: (a) data (e-mail) transmission is in progress with respect to the destination corresponding to the abbreviated number of "001", (b) data transmission has been performed twice with respect to the destination corresponding to the abbreviated number of "002" and currently on standby for the receipt of transmission confirmation (waiting for the confirmation), (c) data transmission has been performed once with respect to the destination corresponding to the abbreviated number of "003" and currently on standby for the receipt of transmission confirmation (waiting for the confirmation).

In the FIG. 11(*a*), the number included in such as "Waiting for sending completion confirmation 2" denotes the number of transmissions of the data. Thus, carrying out resending operation twice means three times of transmission of the same data, and in this case, the screen displays "Waiting for transmission completion confirmation 3".

Further, when the transmission confirmation is set to "No", the waiting operation for transmission confirmation is not carried out, and therefore the screen only displays "Transmission completed".

The following will explain a job condition display screen as receiver information in the case where the sending is completed with one resending with respect to the destination corresponding to the abbreviated number of "001", for example. Note that, here, the transmission confirmation is set to "Yes", and setting of number of resending is "1".

Firstly, the device is connected to a network, and starts data transmission operation with respect to a destination. FIG. 11(*a*) shows the job condition display screen at this stage.

Thereafter, the device waits for the transmission confirmation which will be sent from the receiver. At this stage, the job condition display screen displays "Waiting for transmission completion confirmation 1" as shown in FIG. 11(*b*).

Then, when the device receives a transmission confirmation response from the receiver, which informs of an error result in reception, the device carries out a resending operation, and again waits for the transmission confirmation from the receiver. At this stage, the job condition display screen displays "Waiting for transmission completion confirmation 2", as shown in FIG. 11(*c*).

When the device receives a transmission confirmation response informing that the data transmission is completed due to the foregoing resending operation, the transmission operation is completed. At this stage, the job condition display screen displays "Transmission completed" as shown in FIG. 11(*d*).

The method of counting of the number provided after "Waiting for transmission completion confirmation" is not limited to the foregoing manner of sequentially increasing the number. For example, when the setting of the number of resending is "1" as with the foregoing example, the counting method of sequentially decreasing the number may also be adopted such as the case where "Waiting for transmission completion confirmation 1" comes after "Waiting for transmission completion confirmation 2".

Further, when there is data which has not been transmitted to the destination and is going to be sent after the data transmission to, for example, the destination corresponding to the abbreviation number of "001" (when data transmission is on standby), the job condition display screen may display "Standby".

As described, the facsimile/e-mail device (network communication device) of the present invention has a function as a network facsimile device, which carries out sending/receiving of data via a network. When the facsimile/e-mail device operates as the network facsimile device, the device is provided with a transmission confirmation response function (MDN function) for confirming completion of the transmission of facsimile document data (data) to the receiver by receiving transmission confirmation response from the receiver after the data transmission via network is completed.

When the facsimile document data is sent as e-mail, requirement of the transmission confirmation response by the MDN function may be respectively set for each receiver.

Generally, the transmission confirmation response function (MDN function) is not a compulsory function of a network communication device for carrying out communication via a network. Accordingly, the network communication device of the receiver is not always provided with the MDN function.

However, since the requirement of transmission confirmation response can be respectively set for each receiver, it is possible to set the function so that the transmission confirmation is not provided (the setting of transmission confirmation is "No") when the network communication device of the receiver is not provided with the MDN function.

On this account, it is possible to prevent unnecessary waiting time for transmission confirmation (waiting time for a transmission confirmation response), or unnecessary output of a record of failure of transmission. Further, it is possible to prevent unnecessary resending of the same data, when the device of the receiver is not provided with the MDN function and the data transmission cannot be confirmed even though the data transmission is completed in the destination.

Further, the foregoing transmission information includes timeout period which is a maximum waiting time for the transmission confirmation response, and when the timeout occurs without receiving the transmission confirmation, the receiver information stored in the control memory 3 is modified so that the transmission confirmation with respect to the receiver is not required.

Generally, if the timeout occurs without receiving the transmission confirmation, it is most likely that the device of the receiver is not provided with the MDN function.

In such a case, since the receiver information stored in the control memory 3 is modified so that the transmission confirmation with respect to the receiver is not required when the timeout occurs without receiving the transmission confirmation, it is possible to prevent unnecessary waiting time for transmission confirmation at the second time.

In the described embodiment, the requirement of a transmission confirmation response with respect to the receiver (request for transmission confirmation with respect to the receiver) is respectively set for each receiver (address) of transmission data. However, the present invention is not limited to this arrangement, and the user may set the transmission confirmation so that the request for the transmission confirmation response is made with respect to, for example, all receivers by using the screen for setting the transmission confirmation.

Figure 13:
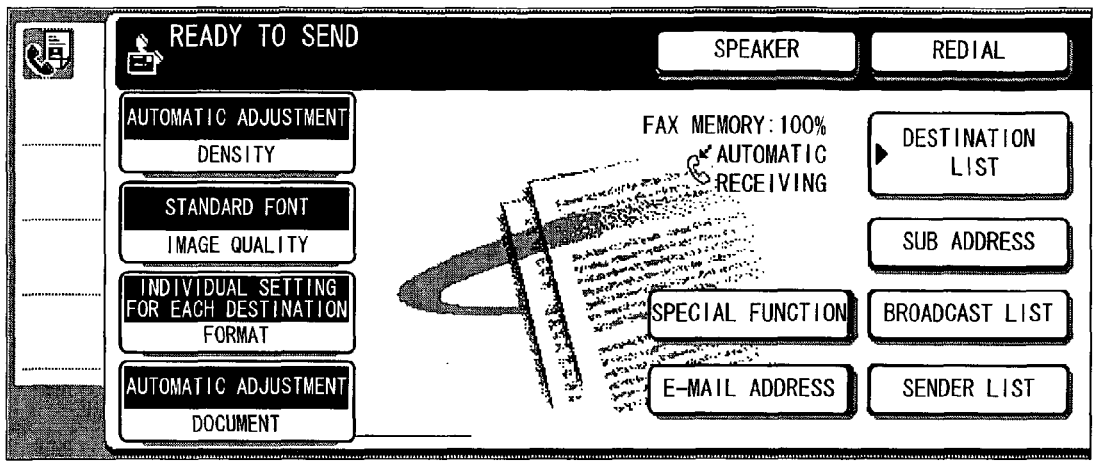
FIGS. 13(a) through 13(c) are drawings showing a flow of setting screen for requesting a transmission confirmation response.
Figure 13:
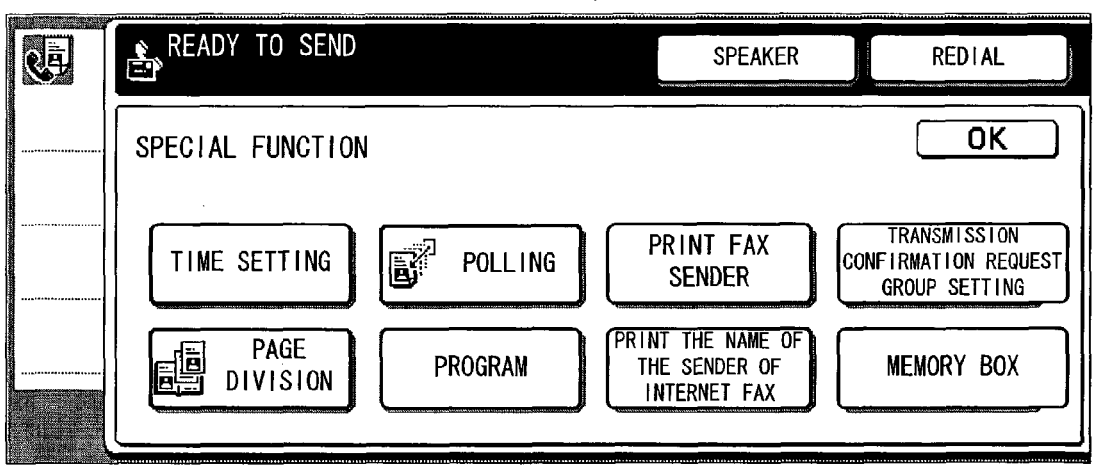
Figure 13:
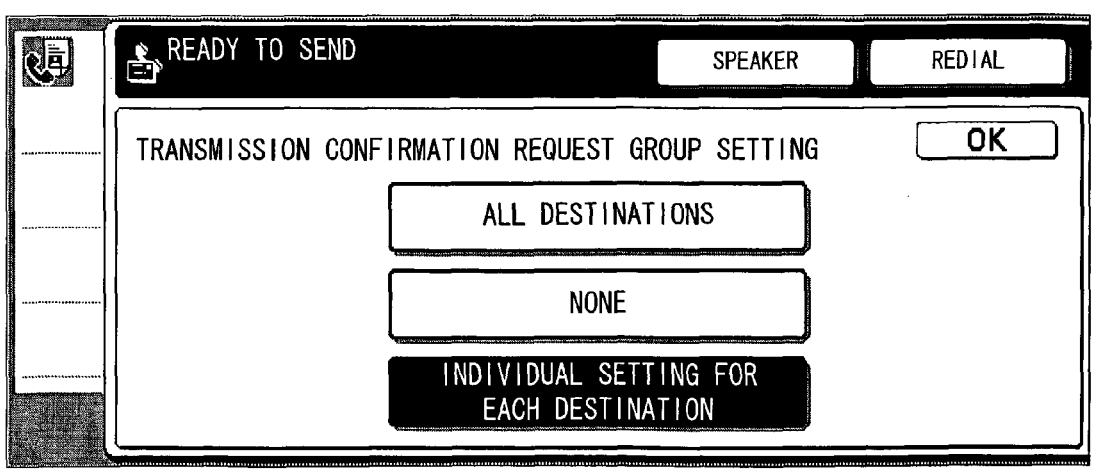

With reference to FIGS. 13(*a*) through 13(*c*), the following will explain an example of the setting screen (panel control section 2) for the request for transmission confirmation.

When the user selects "Special function" in the screen shown in FIG. 13(*a*), the screen shown in FIG. 13(*b*) appears, and when the user selects "Transmission confirmation request group setting" in this screen, the setting screen shown in FIG. 13(*c*) appears.

By selecting (touching) "All destinations" in this setting screen, it is possible to set the transmission confirmation so that the transmission confirmation response is required with respect to all destinations of data transmission.

Further, by selecting (touching) "None", it is possible to set the transmission confirmation so that the transmission confirmation response is not required with respect to all destinations of data transmission.

Otherwise, by selecting (touching) "Individual setting for each destination", it is possible to respectively set the requirement of the transmission confirmation for each destination of data transmission, as described above.

As described, a network communication device according to the present technology with a transmission confirmation response function which allows a user to confirm completion of data transmission to a receiver by receiving a transmission confirmation response from the receiver after completion of the data transmission via a network, includes: input means for inputting transmission information regarding the receiver at the data transmission, so as to carry out the data transmission, wherein: the transmission information includes information indicative of whether or not the transmission confirmation response is required.

Generally, the transmission confirmation response function (MDN function) is not a compulsory function of a network communication device for carrying out communication via a network. Accordingly, the network communication device of the receiver is not always provided with the MDN function.

However, in the foregoing configuration, the user inputs the receiver information, which includes the information of whether or not the transmission confirmation response is required, at the time of data transmission. Thus, it is possible to set the function so that the transmission confirmation is not required (the setting of transmission confirmation is "No") when the network communication device of the receiver is not provided with the MDN function.

On this account, even when the device of the receiver is not provided with the MDN function, it is possible to prevent unnecessary waiting time for transmission confirmation (waiting time for a transmission confirmation response) or unnecessary data resending as a result of absence of the data transmission confirmation even though the data transmission is completed at the destination.

Further, a network communication device according to the present technology with a transmission confirmation response function which allows a user to confirm completion of data transmission to each of receivers by receiving a transmission confirmation response from the receiver after completion of the data transmission via a network, includes: storing means for storing transmission information regarding each receiver, so as to carry out the data transmission, wherein: the transmission information includes information indicative of whether or not the transmission confirmation response is required.

With the foregoing configuration, since the storing means stores transmission including information indicative of whether or not the transmission confirmation response is required, it is possible to previously set the requirement of the transmission confirmation so that the transmission confirmation is not required when the network communication device of the receiver is not provided with the MDN function.

On this account, it is possible to prevent unnecessary waiting time for transmission confirmation response or unnecessary output of a record of failure of transmission. Further, even when the destination terminal does not provided with the MDN function, it is possible to prevent unnecessary resending of the same data as a result of absence of the data transmission confirmation even though the data transmission is completed in the destination.

Further, by having the storing means, it is possible to ease input operation of the user for inputting the transmission information at each time of transmission.

In the foregoing network communication device, it is preferable that the transmission information includes transmission confirmation waiting time, which is a maximum waiting time for the transmission confirmation response.

With the foregoing configuration, it is possible to set the waiting time for the transmission confirmation (timeout period) respectively for each destination.

Accordingly, the waiting time for the transmission confirmation can be adjusted according to the connection condition with the server in the receiver's end, and therefore, for example, it is possible to appropriately set the waiting time for the transmission confirmation.

In the foregoing network communication device, it is preferable that the transmission information includes at least one of file format and compression format with respect to data to be sent.

With the foregoing configuration, it is possible to ease the data transmission, since the file format (for example, TIFF, PDF) or the compression format (for example, MH, MMR) is inputted at the data transmission or is stored in the storing means as the transmission information.

In the foregoing network communication device, it is preferable that the storing means carries out storing of the transmission information when an address or a number indicating the receiver is stored in a corresponding abbreviated number.

With the foregoing configuration, it is possible to ease input operation of the user, since the transmission information is previously stored in the storing means at the time of setting of abbreviated number.

In the foregoing network communication device, it is preferable that the transmission information includes transmission confirmation waiting time, which is a maximum waiting time for the transmission confirmation response, and information regarding the transmission confirmation response stored in the storing means is modified so that the transmission confirmation response with respect to the receiver is not required when the transmission confirmation waiting time runs out without receiving the transmission confirmation response.

Generally, when the sending side has no information of whether or not the receiver (receiving end terminal) is provided with the MDN function, the data transmission is carried out assuming that the receiver is provided with the MDN function; however, if the timeout occurs without receiving the transmission confirmation, it is most likely that the device of the receiver is not provided with the MDN function.

In such a case, with the foregoing configuration, the receiver information stored in the storing section is modified so that the transmission confirmation with respect to the receiver is not required when the timeout occurs without receiving the transmission confirmation. Thus, it is possible to prevent unnecessary waiting time for transmission confirmation at the second time.

In the foregoing network communication device, it is preferable that the transmission information includes transmission confirmation waiting time, which is a maximum waiting time for the transmission confirmation response, and information regarding the transmission confirmation response stored in the storing means is modified so that the transmission confirmation response with respect to the receiver is not required when the data transmission has repeated predetermined times without receiving the transmission confirmation response after the transmission confirmation waiting time.

Generally, if the timeout occurs without receiving the transmission confirmation, it is most likely that the device of the receiver is not provided with the MDN function.

In such a case, with the foregoing configuration, the receiver information stored in the storing section is modified so that the transmission confirmation with respect to the receiver is not required when the data transmission has repeated predetermined times without receiving the transmission confirmation response after the transmission confirmation waiting time. Thus, it is possible to prevent unnecessary waiting time for transmission confirmation at the second time.

The foregoing network communication device preferably further includes: informing means for informing the user that the information regarding the transmission confirmation response stored in the storing means is modified so that the transmission confirmation response with respect to the receiver is not required.

With the foregoing configuration, it is possible to inform the user that the setting of the transmission confirmation response is modified so that the transmission confirmation response with respect to the receiver is not required, since it is most likely that the terminal of the receiver is not provided with the MDN function.

In the foregoing network communication device, it is preferable that the device carries out data resending in case of receiving the transmission confirmation response, which informs that the receiver has failed to properly receive the transmitted data, and number of the data resending may be stored in the storing means.

With the foregoing configuration, it is possible to carry out data resending operation in case where the receiver's terminal fails to properly receive the data transmitted from the sender, i.e., the sending end terminal (in case of receiving the transmission confirmation response informing that the receiver has failed to properly receive the transmitted data). The resending operation may be carried out the predetermined number of times, which number is stored in the storing means. This function enables appropriate data resending operation.

Further, in a network communication device according to the present technology with a function as a network facsimile device for carrying out sending and receiving of data via a network, and a function of requesting for transmission confirmation response when sending the data, the device is capable of setting information of whether or not the transmission confirmation response is required according to a receiver.

With the foregoing configuration, the device is capable of setting information of whether or not the transmission confirmation response is required according to a receiver. Therefore, when the network communication device of the receiver is not provided with the MDN function, the setting of the transmission confirmation is modified so that the transmission confirmation response is not required.

On this account, it is possible to prevent unnecessary waiting time for transmission confirmation response or unnecessary output of a record of failure of transmission. Further, it is possible to prevent unnecessary resending of the same data as a result of absence of the data transmission confirmation even though the data transmission is completed in the destination.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A network communication device comprises a memory and including a document reading section, the device having a message disposition notification function which allows confirmation of completion of data disposition to a receiver by receiving a message disposition notification from the receiver after completion of transmission via a network of a readout data output from the document reading section, the network communication device transmitting the data in a selected one of file formats, the network communication device comprising:

input means for inputting transmission information for use in the data transmission for each data transmission, wherein:
the transmission information includes information indicative of whether or not the message disposition notification is required and the file format of the transmitted data;
for a transmission in PDF format, the network communication device allows for a selective setting as to whether or not a message disposition notification is required from the receiver to the network communications device, and thus enables a transmission with the capabilities of the receiver being considered, by selectively modifying the transmission setting function of the transmitter;
wherein the network communication device comprises both a function (1) of selectively making individual settings for each transmission or recipient as to whether a transmission confirmation (MDN) is required and a function (2) of making collective setting for all recipients as to whether the transmission confirmation (MDN) is required for all recipients;
wherein using the input means a user can select either the function (1) or the function (2);
wherein the transmission information includes disposition notification waiting time, and
wherein the disposition notification waiting time can be selectively set for each transmission.

2. The network communication device as set forth in claim 1, wherein the disposition notification waiting time is a maximum waiting time for awaiting receipt of the message disposition notification.

3. The network communication device as set forth in claim 1, wherein:
the transmission information includes a compression format for the transmitted data.

4. The network communication device as set forth in claim 1, wherein:
the transmission information includes a number of resend attempts permitted for data resending in case of receiving the message disposition notification which informs that the receiver has failed to properly receive the transmitted data.

5. A network communication device with a message disposition notification function which allows confirmation of completion of data disposition to each of plural receivers by receiving a message disposition notification from the respective receivers after completion of data transmission via a network, the network communication device transmitting the data in a selected one of file formats, the network communication device comprising:
storing means for storing transmission information regarding each receiver for use in the data transmission,
wherein:
the transmission information includes information indicative of whether or not the message disposition notification is required and the file format of the transmitted data;
for a transmission in PDF format, the network communication device allows for a selective setting as to whether or not a message disposition notification is required from the receiver to the network communications device, and thus enables a transmission with the capabilities of the receiver being considered, by selectively modifying the transmission setting function of the transmitter;
wherein the network communication device comprises both a function (1) of selectively making individual settings for each transmission or recipient as to whether a transmission confirmation (MDN) is required and a function (2) of making a collective setting for all recipients as to whether the transmission confirmation (MDN) is required for all recipients;
input means whereby a user can select either the function (1) or the function (2);
wherein the transmission information includes disposition notification waiting time; and
wherein the disposition notification waiting time can be selectively set for each recipient.

6. The network communication device as set forth in claim 5, wherein the disposition notification waiting time is a maximum waiting time for awaiting receipt of the message disposition notification.

7. The network communication device as set forth in claim 5, wherein:
the transmission information further includes a compression format for the transmitted data.

8. The network communication device as set forth in claim 5, wherein:
the storing means stores the transmission information when an address or number indicating a particular one of the plural receivers is registered in association with an abbreviated number.

9. The network communication device as set forth in claim 5, wherein:
the transmission information includes disposition notification waiting time, the disposition notification waiting time being a maximum waiting time for awaiting receipt of the message disposition notification, and
if the disposition notification waiting time runs out without receiving the message disposition notification from a particular one of the plural receivers, the storing means stores a setting that there is no need to request the message disposition notification from the particular one of the receivers.

10. The network communication device as set forth in claim 9, further comprising:
informing means for informing the user that the storing means has stored the setting that there is no need to request the message disposition notification from the particular one of the plural receivers.

11. The network communication device as set forth in claim 5, wherein:
the transmission information includes disposition notification waiting time, the disposition notification waiting time being a maximum waiting time for awaiting receipt of the message disposition notification, and
if the disposition notification waiting time runs out without receiving the message disposition notification for a predetermined succeeding repetitions of the data transmission, the storing means stores a setting that there is no need to request the message disposition notification.

12. The network communication device as set forth in claim 11, further comprising:
informing means for informing the user that the storing means has stored the setting that there is no need to request the message disposition notification.

13. The network communication device as set forth in claim 5, wherein:
in case of receiving the message disposition notification which informs that a particular one of the plural receivers has failed to receive the transmitted data, the network communication device carries out data resending, and the storing means stores a number of data resending.

14. A network communication device comprises memory and a function as a network facsimile device for carrying out sending and receiving of data via a network, the network communication device transmitting the data in a selected one of file formats, the network communication device allowing for a setting, for each data transmission, of an indication as to whether or not a message disposition notification is required, for a data transmission in PDF format, the network communication device allowing for a selective setting of an indication as to whether or not the message disposition notification is required from a receiver to the network communications device, and thus enabling a transmission with the capabilities of the receiver being considered, by selectively modifying the transmission setting function of the transmitter, the network communication device comprises both a function (1) of selectively making individual settings for each transmission or recipient as to whether a transmission confirmation (MDN) is required and a function (2) making collective setting for all recipients as to whether the transmission confirmation (MDN) is required for all recipients; wherein using input means a user can select either the function (1) or the function (2); and wherein the disposition notification waiting time can be selectively set for each transmission.

* * * * *